(12) United States Patent
Yu et al.

(10) Patent No.: US 10,193,224 B2
(45) Date of Patent: Jan. 29, 2019

(54) SUBMINIATURE PHOTO PHASED ARRAY ANTENNA

(71) Applicant: KOREA ADVANCED INSTITUTE OF SCIENCE AND TECHNOLOGY, Daejeon (KR)

(72) Inventors: Kyoungsik Yu, Daejeon (KR); Jong-Bum You, Daejeon (KR); Jun-Su Baek, Daejeon (KR); Jung Hoon Park, Daejeon (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 76 days.

(21) Appl. No.: 15/543,903

(22) PCT Filed: Nov. 16, 2015

(86) PCT No.: PCT/KR2015/012274
§ 371 (c)(1),
(2) Date: Jul. 14, 2017

(87) PCT Pub. No.: WO2017/086490
PCT Pub. Date: May 26, 2017

(65) Prior Publication Data
US 2018/0006372 A1    Jan. 4, 2018

(51) Int. Cl.
*H01Q 3/30*    (2006.01)
*G02B 6/122*    (2006.01)
*H01Q 21/06*    (2006.01)
*H01Q 21/08*    (2006.01)
*G02B 6/00*    (2006.01)
*H01Q 21/00*    (2006.01)

(52) U.S. Cl.
CPC .............. *H01Q 3/30* (2013.01); *G02B 6/00* (2013.01); *G02B 6/1223* (2013.01); *H01Q 21/0068* (2013.01); *H01Q 21/061* (2013.01); *H01Q 21/08* (2013.01)

(58) Field of Classification Search
CPC ......... H01Q 3/30; H01Q 21/08; H01Q 6/1223
See application file for complete search history.

(56) References Cited

FOREIGN PATENT DOCUMENTS

| KR | 1020070118275 | 12/2007 |
|----|---------------|---------|
| KR | 1020120016672 | 2/2012  |
| KR | 1020130129886 | 11/2013 |
| KR | 1020140090165 | 7/2014  |
| KR | 1020150090035 | 8/2015  |

*Primary Examiner* — Jack Dinh
(74) *Attorney, Agent, or Firm* — Leber IP Law; David C. Robertson

(57) ABSTRACT

A device forming a photonic phased array antenna includes a low-refractive dielectric substrate, a nano-structured thin film formed on the low-refractive dielectric structure, and a high-refractive semiconductor waveguide formed over the low-refractive dielectric substrate and configured to operate in a single mode in the nano-structured thin film, wherein an antenna radiating a phase-modulated light wave to a free space is miniaturized to concentrate a radiated beam of a phased array antenna and to widen a scanning range.

12 Claims, 4 Drawing Sheets

(a)

(b)  (c)

SUBMINIATURE PHOTO PHASED ARRAY ANTENNA

TECHNICAL FIELD

Embodiments of the inventive concept relate a photonic phased array antenna and more particularly, relate to a structure and arrangement of devices suitable for implementing principally required functions of a photonic phased array antenna. In detail, embodiments of the inventive concept relate to a device that is capable of forming a light beam in a narrow area using interference of a light wave by controlling phases of light waves supplied respectively to nanophotonic antennas under multi-arrangement of the nanophotonic antennas.

BACKGROUND ART

Photonic phased array antennas have received a lot of attention as light sources for image scanning, communication with Light Direction And Raging (LiDAR), autonomous vehicles, robots, and measuring machines. In the application areas, photonic phased array antennas require performances such as low power consumption, wide angle and high-speed scanning, high directivity, and single main lobe radiation.

A photonic phased array antenna is formed of an external light source, a coupler, a distributor, a phase controller, and an antenna. Such elements basically have structures of waveguides. A light wave supplied from the external light source is coupled with a planar integrated optical circuit through a coupler and distributed in an arrangement of a bundle of waveguides through a distributor. The distributed light waves are modulated in phase through the phase controller, then supplied to the antenna through the waveguides, and radiated to a free space.

A foregoing invention (US Patent Application No. 2014/0192394 A1) about a nanophotonics-based photonic phased array antenna has proposed a photonic phased array antenna where a phase-controlled photonic device based in a semiconductor silicon material is integrated in a form of matrix. The antenna employed in the foregoing invention is formed in a grating structure on a dielectric material film, and such a structure is utilized in most photonic phased array antennas. However, such a unit structure of grating-structured antenna occupies a large area in transverse and longitudinal directions of a bundle of waveguides. Due to this structure, in the case that a period of antenna arrangement becomes larger, there is a problem that a permissible beam scanning angle range is reduced and the number of side lobes except a main lobe increases. Furthermore, for the case of a grating structured antenna requiring a number of gratings in a direction of waveguide, there is a problem of causing a very large period in a longitudinal direction when forming a 2D array antenna.

DETAILED DESCRIPTION OF THE INVENTION

Technical Problem

Embodiments of the inventive concept provide miniaturization of a photonic phased array antenna by introducing nanophotonics technology using a semiconductor and a metallic material, and then provide lower power consumption and wide-area scanning of a single main lobe through the miniaturization.

Technical Solution

According to an embodiment, a device forming a photonic phased array antenna includes a low-refractive dielectric substrate, a nano-structured thin film formed on the low-refractive dielectric structure, and a high-refractive semiconductor waveguide formed over the low-refractive dielectric substrate and configured to operate in a single mode in the nano-structured thin film, wherein an antenna radiating a phase-modulated light wave to a free space is miniaturized to concentrate a radiated beam of a phased array antenna and to widen a scanning range.

The antenna may be arranged in a form of 1D 1×M along a transverse direction and a 1D beam may be scanned in a space of the transverse direction that is the same with an alignment direction of the form of 1×M by sequentially varying a phase that is supplied to each antenna.

The antenna may be arranged in a form of 2D M×N along transverse and longitudinal directions and a 2D beam may be scanned in a space of the transverse and longitudinal directions, in which the form of 1×M is aligned, by sequentially varying a phase that is supplied to each antenna.

The high-refractive waveguide may be floated by removing the low-refractive dielectric substrate in the antenna.

The device may further include a low-refractive included in the antenna to protect the device.

The high-refractive light waveguide may receive a Transverse Electric (TE) mode light wave where an electric field is formed in a direction perpendicular to a traveling direction of light.

According to an embodiment, a device forming a photonic phased array antenna includes a nano-structured thin film, and a high-refractive semiconductor waveguide floated by removing a low-refractive dielectric substrate and included in the nano-structured thin film, and configured to operate in a single mode, wherein an antenna radiating a phase-modulated light wave is miniaturized to concentrate a radiated beam of a phased array antenna and to widen a scanning range.

Advantageous Effects of the Invention

According to embodiments of the inventive concept, it is possible for a light wave to be coupled in a level equal to or lower than a diffraction limit by using a surface plasmon wave excited at an interface between a metal and a dielectric in employment of a metallic nanophotonic antenna structure as a unit device. With this configuration, it is possible to reduce a scale of a unit antenna device within a wavelength of ¼ that is smaller than an operating wavelength in transverse and longitudinal directions.

According to embodiments of the inventive concept, it is possible for a photonic phased array to perform a single main lobe operation by forming an array period in ½ of a wavelength in employment of a subminiature antenna structure, and to widen an angle which can be scanned in a given phase variation.

According to embodiments of the inventive concept, it is possible to save power of a light source due to concentration of a light wave by a single beam operation, and to reduce power consumption of a phase controller due to improvement of a beam scanning range through phase modulation.

MODE OF THE INVENTION

Hereinafter, embodiments of the inventive concept will be described below in conjunction with the accompanying drawings.

Figure 1:
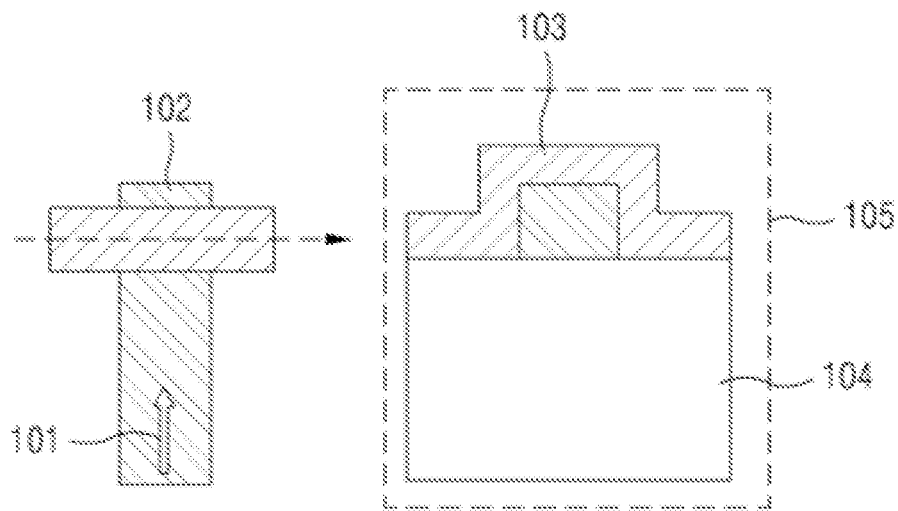
FIGS. 1A to 1C are schematic diagrams illustrating a device forming a photonic phased array antenna according to an embodiment of the inventive concept.
Figure 1:
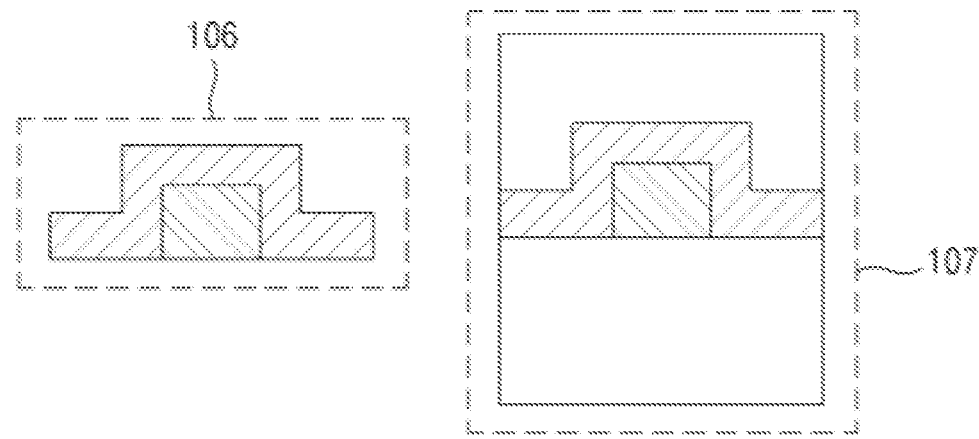

FIGS. 1A to 1C are schematic diagrams illustrating a device forming a photonic phased array antenna according to an embodiment of the inventive concept.

Unit antennas 105, 106, and 106 may be formed by forming a device, which forms a photonic phased array antenna, with a high-refractive semiconductor waveguide 102, a metallic thin-film structure 103, and a low-refractive dielectric substrate 104.

Referring to FIG. 1A, the device forming the photonic phased array antenna may include the low-refractive dielectric substrate 104, the metallic thin-film structure 103 formed on the low-refractive dielectric substrate 104, and the high-refractive semiconductor waveguide 104 formed over the low-refractive dielectric substrate 104 and operating in a single mode in the metallic thin-film structure 103. The antenna radiating a phase-modulated light wave to a free space may be miniaturized to concentrate a beam, which is radiated from an antenna array, and to widen a scanning range. In this case, the metallic thin-film may use, for example, a nano-structured thin film.

Radiation efficiency of the antenna may be affected from an element scale and a formation pattern of a metallic thin film and a waveguide. In some case, the unit antenna 106 without a substrate may show high radiation efficiency. It is also possible to use the unit antenna 107 with a form including an upper low-refractive film for protecting the device.

Referring to FIG. 1B, as the unit antenna 106 from which a substrate is removed, a device forming a photonic phased array antenna may include a nano-structured thin film and a high-refractive semiconductor waveguide. In this case, the high-refractive semiconductor waveguide may be floated by removing a low-refractive dielectric substrate, and may be included, operating in a single mode, in the nano-structured film.

Referring to FIG. 1C, as the unit antenna 107 including an upper low-refractive film, a device forming a photonic phased array antenna may include a low-refractive dielectric substrate, a nano-structured thin film formed on the low-refractive dielectric substrate, a high-refractive semiconductor waveguide formed over the low-refractive dielectric substrate and operating in a single mode in the nano-structured thin film, and a low-refractive film formed on the nano-structure thin film.

A Transverse Electric (TE) mode light wave, in which an electric field is formed perpendicular to the travelling direction of light, is incident on the light waveguide. In this waveguide mode, light is coupled with a resonant mode of the unit antenna 105 after arriving at the metallic thin-film structure and then radiated to a free space. This resonance is due to a surface plasmon generated between a metal and a dielectric. The corresponding resonant mode may have a unique resonant wavelength and obtain the highest radiation efficiency in the case that an operating wavelength matches with a resonant wavelength. Additionally, in the case of varying an operating wavelength about a resonant wavelength, it is possible to adjust a beam scanning angle in a longitudinal direction (waveguide direction). Since the aforementioned unit device structure can be formed with a geometric dimension smaller than a wavelength of a light wave, it is suitable for application to a phased array antenna having a period of ½ wavelength.

According to an embodiment, it is possible to propose a subminiature metallic nano-antenna structure in a unit of device forming a photonic phased array antenna. The metallic nano-antenna structure is a structure utilizing the merit that allows a light wave to be coupled with a level equal to or lower than a diffraction limit, as a structure using a surface plasmon excited at an interface between a metal and a dielectric.

The number of side lobes of a photonic phased array antenna is dependent on an antenna arrangement period in contrast to an operating wavelength. In the case that an antenna arrangement period is larger than an operating wavelength, two or more side lobes radiated light. As an antenna arrangement period becomes larger, the number of side lobes further increases. In other words, it means that for an operation of a main lobe advantageous to efficient concentration of a radiated beam, an antenna arrangement period must be smaller than an operating wavelength. Additionally, it is necessary for the antenna arrangement period to be further smaller in aspect of improving beam scanning efficiency. For example, in the case that an antenna arrangement period becomes a ½ wavelength, it is possible to secure a wide beam scanning range of 90° in a π/2 phase variation. Accordingly, a photonic phased array antenna structure according to an embodiment may provide an antenna arrangement period of ½ wavelength, and thereby implement wide-range scanning of a single main lobe.

Figure 2:
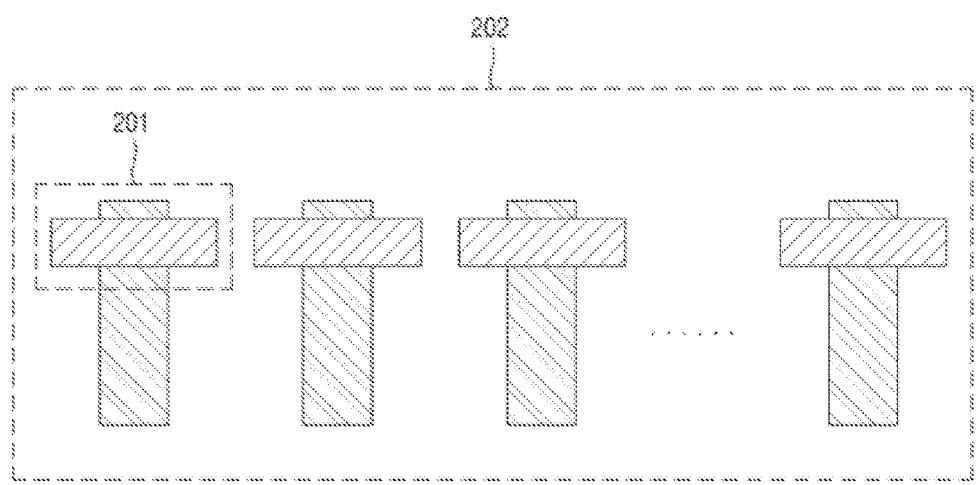
FIG. 2 is a schematic diagram illustrating a 1D phased array antenna with unit antennas arranged in a form of 1×M according to an embodiment of the inventive concept.

Effects according to embodiments of the inventive concept will be described below in comparison with a grating-structured antenna. In the case of using a semiconductor material, for example, silicon, it is possible to basically implement a waveguide array having a period of ½ wavelength. This is permissible due to the characteristics of high optical confinement originated from a large difference of refractive indexes between a semiconductor core material and a cladding material enclosing the semiconductor core material. In this case, it is required to sufficiently widely prepare an interval between light waveguides for the cross-talk free characteristics. This requirement may be accomplished by reducing a width of the light waveguide. However, in the case of supplying light to a grating-structured antenna, a photonic mode with too narrow waveguides may cause unnecessary horizontal radiation due to much large diffraction and cause interference between antennas through the unnecessary horizontal radiation. Differently, for a photonic phased array antenna structure according to an embodiment of the inventive concept, it is possible to improve vertical radiation efficiency through surface plasmon resonance phenomenon that is specially excited in a nano-structure and to minimize interference between antennas by providing a very short longitudinal length. a. FIG. 2 is a schematic diagram illustrating a 1D phased array antenna with unit antennas arranged in a form of 1×M according to an embodiment of the inventive concept.

A 1D phased array antenna 202 may be formed by arranging a plurality of unit antennas 201 in a form of 1×M.

The 1D phased array antenna 202 may be formed by arranging the unit antennas 201 in a form of 1×M with a uniform interval which is set in advance.

A transverse period between the unit antenna elements may be minimized to be in a scale of ½ wavelength. Light waves with a uniform phase difference may travel respectively through high-refractive semiconductor waveguides along the 1D phased array. In this case, as the number of individual antennas becomes larger, it is possible to activate beam scanning of high resolution through superimposed constructive interference.

Figure 3:
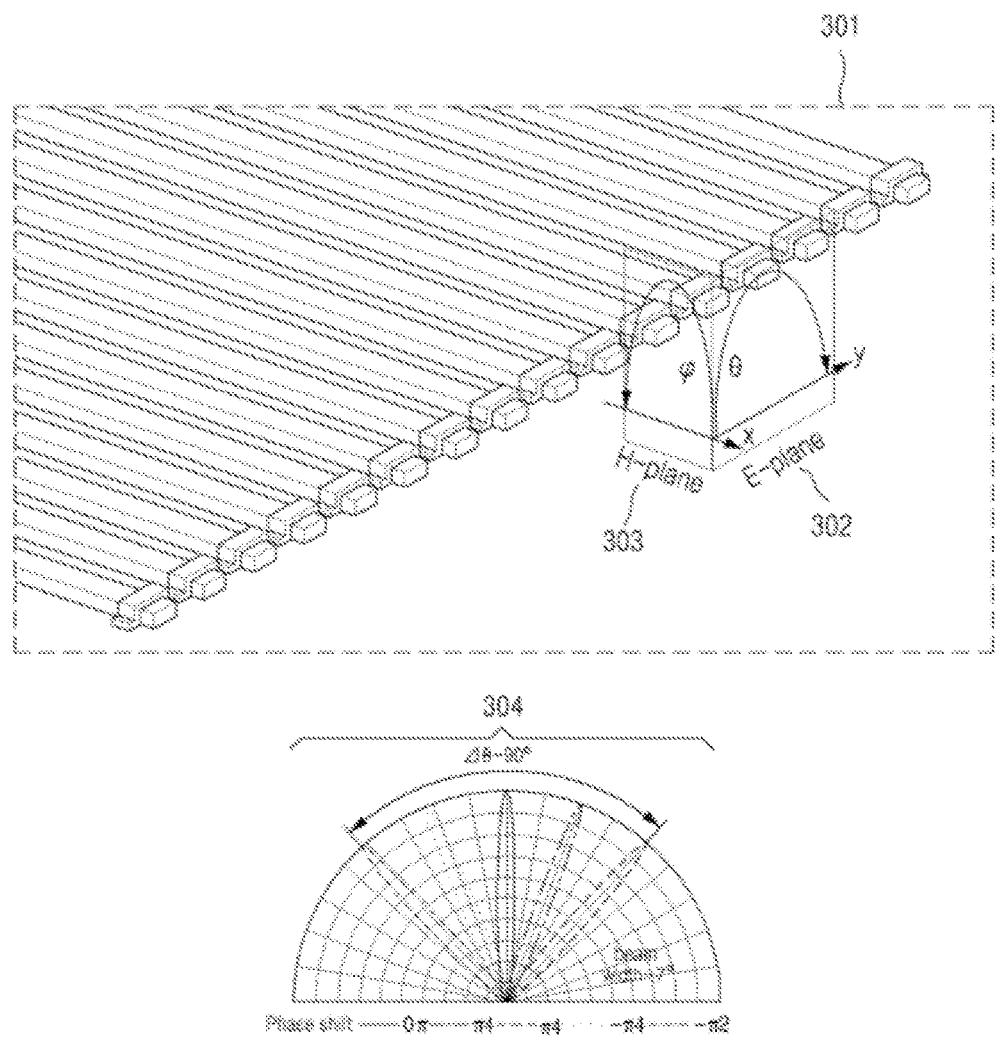
FIG. 3 exemplarily illustrates a phased array antenna with unit antennas arranged in a form of 1×16 along a transverse direction according to an embodiment of the inventive concept.

FIG. 3 exemplarily illustrates a phased array antenna with unit antennas arranged in a form of 1×16 along a transverse direction according to an embodiment of the inventive concept.

A travelling light wave may be supplied to unit antennas and then radiated to a free space. A traverse (E-plane 302) beam pointing angle may be adjusted depending on a phase difference. The reference numeral 304 indicates an E-plane beam radiation distribution depending on a phase difference of a 1×16 array antenna according to an embodiment of the inventive concept. In the case of adjusting each phase difference between antennas from $\pi/2$ to $-\pi/2$, it is possible to have a scanning range of 90° in a traverse direction. As in the case of unit antennas, in the case of varying an operating wavelength supplied to array antennas, it is possible to change a longitudinal (H-plane 303) beam pointing angle. Additionally, the longitudinal (H-plane 303) beam pointing angle may be adjusted even depending on an arrangement period.

Figure 4:
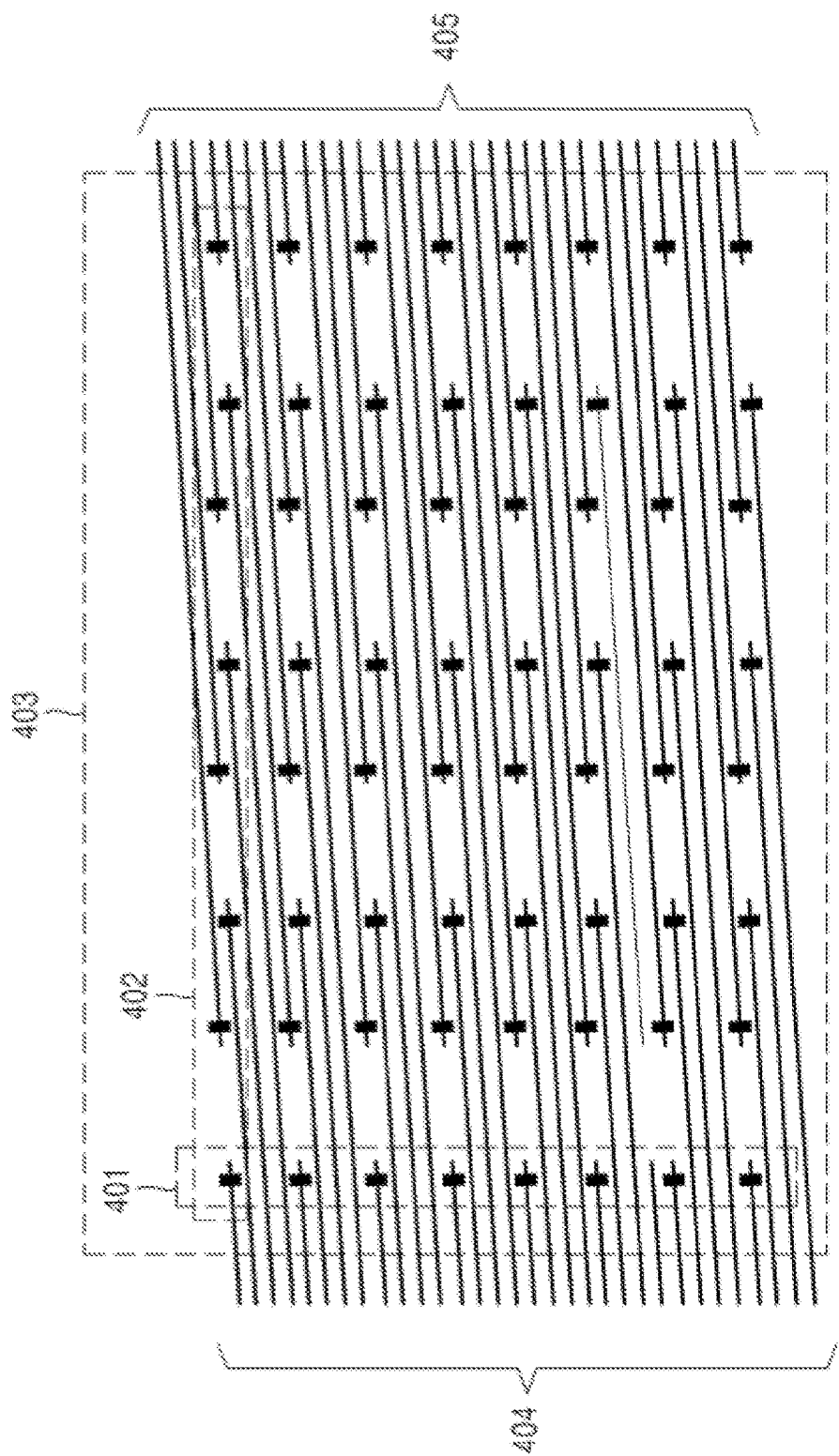
FIG. 4 is a schematic diagram illustrating a 2D phased array antenna with unit antennas arranged in a form of M×N according to an embodiment of the inventive concept.

FIG. 4 is a schematic diagram illustrating a 2D phased array antenna with unit antennas arranged in a form of M×N according to an embodiment of the inventive concept.

FIG. 4 shows an example of a photonic phased array antenna in which unit antennas according to an embodiment of the inventive concept are arranged in a form of 8×8 on a 2D plane. The 2D phased array antenna 405 may be formed by arranging a plurality of unit antennas in a form of M×N. The 2D phased array antenna 405 may be formed by arranging the unit antennas 201 in a form of M×N with a uniform interval which is set in advance.

The number of arrays may increase to reduce a beam width. The reference numerals 401 and 402 indicate a transverse 1×8 array and a longitudinal 8×1 array, respectively. Light waves travelling respectively through a left waveguide array 404 are supplied to odd-numbered longitudinal 1×8 array and light waves traveling respectively through a right waveguide 405 are supplied to an even-numbered longitudinal 1×8 array. In this manner, it is possible to implement longitudinal and transverse beam scanning in the inventive structure by forming a 2D phased array structure in combination with 8 1D phased array structures.

A subminiature metallic nano-antenna according to an embodiment of the inventive concept overcomes a shortness of very lengthening a longitudinal period in case of implementing a 2D phased array antenna of M×N because a grating structure generally occupies a wide space in a longitudinal direction (propagation direction), and has an advantage suitable for implementing a 2D phased array antenna by providing a very small device area in longitudinal and transverse directions. Consequently, a subminiature metallic nano-antenna according to an embodiment of the inventive concept may implement a 2D phased array antenna system, which is capable of minimizing a volume of side lobes and performing a wide-range scanning, by utilizing a structure proposed herein.

INDUSTRIAL APPLICABILITY

While embodiments of the present disclosure have been shown and described with reference to the accompanying drawings thereof, it will be understood by those skilled in the art that various changes and modifications in form and details may be made therein without departing from the spirit and scope of the present disclosure as defined by the appended claims and their equivalents. For example, it may be allowable to achieve desired results although the embodiments of the present disclosure are performed in other sequences different from the descriptions, and/or the elements, such as system, structure, device, circuit, and so on, are combined or assembled in other ways different from the descriptions, replaced or substituted with other elements or their equivalents.

Therefore, other implementations, other embodiments, and equivalents of the appended claims may be included in the scope of the appended claims.

The invention claimed is:

1. A device constituting a photonic phased array antenna, the device comprising:
   a low-refractive dielectric substrate;
   a nano-structured thin film formed on the low-refractive dielectric substrate; and
   a high-refractive semiconductor waveguide formed over the low-refractive dielectric substrate and configured to operate in a single mode in the nano-structured thin film,
   wherein an antenna radiating a phase-modulated light wave to a free space is miniaturized to concentrate a radiated beam of a phased array antenna and to widen a scanning range.

2. The device of claim 1, wherein the antenna is arranged in a form of one-dimensional (1D) 1×M along a transverse direction and a 1D beam is scanned in a space of the transverse direction that is the same with an alignment direction of the form of 1×M by sequentially varying a phase that is supplied to each antenna.

3. The device of claim 1, wherein the antenna is arranged in a form of 2D M×N along transverse and longitudinal directions and a 2D beam is scanned in a space of the transverse and longitudinal directions, in which the form of 1×M is aligned, by sequentially varying a phase that is supplied to each antenna.

4. The device of claim 1, wherein the high-refractive waveguide is floated by removing the low-refractive dielectric substrate in the antenna.

5. The device of claim 1, further comprising:
   a low-refractive film in the antenna to protect the device.

6. The device of claim 1, wherein the high-refractive light waveguide is configured to receive a Transverse Electric (TE) mode light wave where an electric field is formed in a direction perpendicular to a travelling direction of light.

7. A device forming a photonic phased array antenna, the device comprising:
   a nano-structured thin film; and
   a high-refractive semiconductor waveguide floated by removing a low-refractive dielectric substrate and included in the nano-structured thin film, and configured to operate in a single mode,
   wherein an antenna radiating a phase-modulated light wave is miniaturized to concentrate a radiated beam of a phased array antenna and to widen a scanning range.

8. The device of claim 7, wherein the antenna is arranged in a form of 1D 1×M along a transverse direction and a 1D beam is scanned in a space of the transverse direction that is the same with an alignment direction of the form of 1×M by sequentially varying a phase that is supplied to each antenna.

9. The device of claim 7, wherein the antenna is arranged in a form of 2D M×N along transverse and longitudinal directions and a 2D beam is scanned in a space of the transverse and longitudinal directions, in which the form of 1×M is aligned, by sequentially varying a phase that is supplied to each antenna.

10. A device forming a photonic phased array antenna, comprising:
   a low-refractive dielectric substrate;
   a nano-structured thin film formed on the low-refractive dielectric substrate; and
   a high-refractive semiconductor waveguide formed over the low-refractive dielectric substrate and configured to operate in a single mode in the nano-structured thin film,
   a low-refractive film formed on the nano-structured thin film,
   wherein an antenna radiating a phase-modulated light wave is miniaturized to concentrate a radiated beam of a phased array antenna and to widen a scanning range.

11. The device of claim 10, wherein the antenna is arranged in a form of 1D 1×M along a transverse direction and a 1D beam is scanned in a space of the transverse direction that is the same with an alignment direction of the form of 1×M by sequentially varying a phase that is supplied to each antenna.

12. The device of claim 10, wherein the antenna is arranged in a form of 2D M×N along transverse and longitudinal directions and a 2D beam is scanned in a space of the transverse and longitudinal directions, in which the form of 1×M is aligned, by sequentially varying a phase that is supplied to each antenna.

* * * * *